Oct. 29, 1940.    D. J. WAGLER    2,219,855
ROLLING EYE FOR DOLLS
Filed Jan. 25, 1939    2 Sheets—Sheet 1
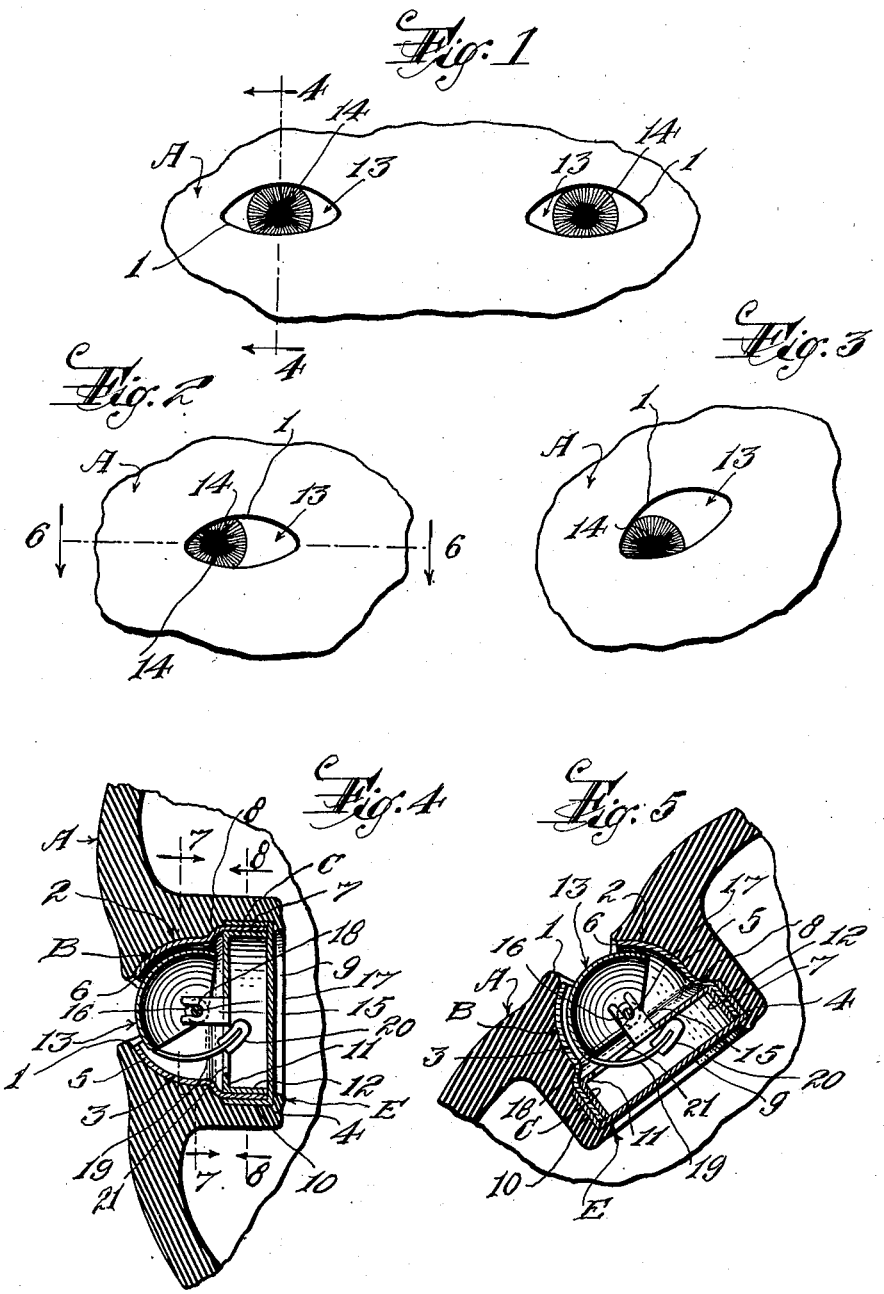

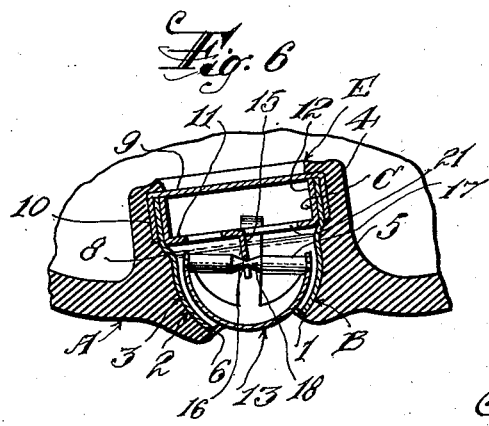
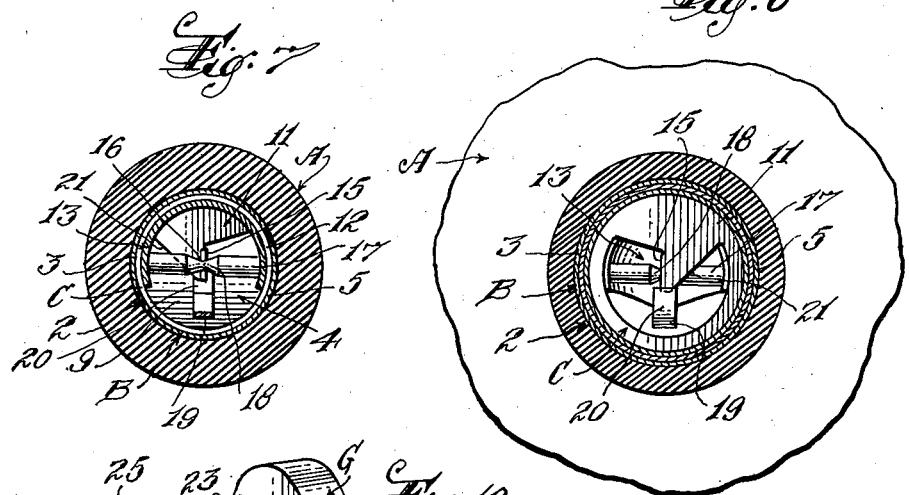
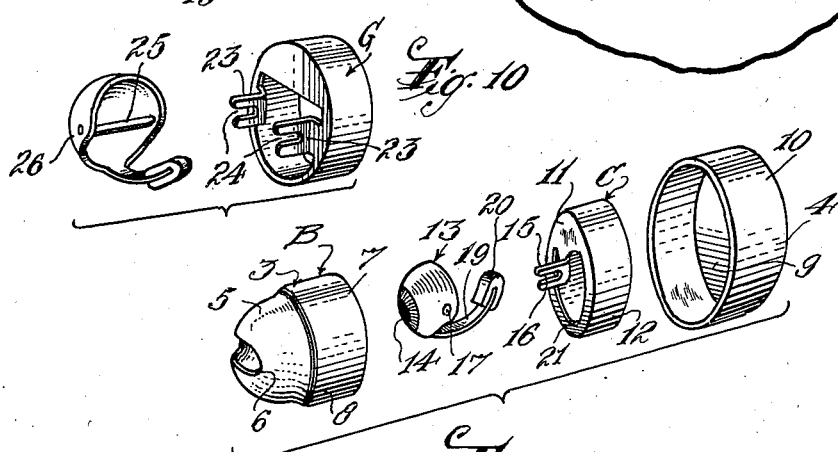

Patented Oct. 29, 1940

2,219,855

UNITED STATES PATENT OFFICE 2,219,855

ROLLING EYE FOR DOLLS

David J. Wagler, Irvington, N. J., assignor to Leo J. Schlitzer, New York, N. Y.

Application January 25, 1939, Serial No. 252,721

12 Claims. (Cl. 46—168)

This invention relates particularly to artificial so-called "flirting eyes" for dolls and artificial figures, which include eye members that are adapted to be movably mounted in eye openings or sockets within the head of a doll or the like to simulate natural movement of the eyes as in opening or closing thereof and in sidewise or rolling movement of the eye balls.

One object of the invention is to provide an eye unit of this character which shall embody novel and improved features of construction for securely mounting the eye-ball in a casing against displacement due to rough handling or by the insertion of a child's finger or an implement through the eye opening of the doll head in which the eye unit is mounted.

A further object is to provide such an eye unit embodying novel and improved features of construction whereby the eye-ball shall be freely movable within certain limits and with a minimum of possibility of becoming stuck or jammed in such a manner as to impair the operation of the eye ball or the effects desired to be produced by the unit.

Other objects are to provide such an eye unit that shall be simple, inexpensive, strong and durable in construction and shall produce a realistic simulation of the natural movements of the human eye; and to obtain other advantages and results as will appear from the following description when read in conjunction with the accompanying drawings in which Figure 1 is a fragmentary front elevational view of the face of a doll head embodying eye units constructed in accordance with my invention, showing the eyeballs in normal forwardly facing position.

Figure 2 is a similar view showing one of the eye openings with the corresponding eyeball rolled to one end of the eye opening.

Figure 3 is a similar view showing another position of the eyeball.

Figure 4 is a fragmentary transverse vertical sectional view on the line 4—4 of Figure 1.

Figure 5 is a similar view showing the doll head tilted toward horizontal position to simulate a closed eye position by the eye unit.

Figure 6 is a horizontal sectional view on the line 6—6 of Figure 2 showing the doll head tilted sidewise.

Figure 7 is a fragmentary sectional view on the line 7—7 of Figure 4.

Figure 8 is a similar view on the line 8—8 of Figure 4,

Figure 9 is an exploded perspective view showing the various parts of the eye unit in disassembled relation, and Figure 10 is a composite perspective view of an eyeball and a bracket showing a modification of the invention.

Specifically describing the illustrated embodiment of the invention the reference character A designates a doll head which may be formed of any suitable material, the invention contemplating a use of the eye unit in either elastic rubber doll heads or in relatively hard inelastic doll heads formed of wood pulp or the like. As usual, the doll head is formed with eye openings 1 and in accordance with the invention recesses 2 are formed in the inner walls of the face of the doll head to register with and merge into the eye openings 1.

The eye units are identical in construction so that only one will be described. Each eye unit includes a casing or housing B which is preferably, although not necessarily, formed of two complemental sections 3 and 4. As shown, the section 3 has a hemispherical portion 5 formed with an opening 6 to register with the eye opening 1 of the doll head, the section also having a perimetral circular flange 7 and a shoulder 8 between said flange and the hemispherical portion 5. The section 4 is cup-shaped to telescope over the flange 7 and includes a base portion 9 and a perimetral flange 10.

Clamped between the shoulder 8 and the base 9 of the section 4 is an eyeball supporting bracket C which preferably is cup-shaped with a perimetral or annular portion flange 12 which nicely fits within the perimetral flange 7 of the casing section 3, and a bottom wall 11 extending across one end. The flange 12 is preferably of a depth substantially equal to the distance between the shoulder 8 and the base or bottom 9 of the casing section 4 so that the bracket C is firmly clamped in position between the two casing sections.

An eyeball member 13 is directly connected by a single connection with the bracket C so as to have limited universal movement relative to the bracket. This eyeball member is shown as comprising a segment of a hollow sphere disposed within the hemispherical portion 5 of the casing B and having the representation 14 of a pupil and iris to be exposed through the openings 6 and 1.

As shown, the bottom wall of the bracket C has an arm 15 struck up and projecting approximately perpendicularly therefrom into the hemispherical portion 5 of the casing. The arm 15 is bifurcated or has an open slot 16 facing toward the opening 6 of the casing and disposed approximately in the horizontal diametral plane of the casing.

The eyeball 13 has a pivot rod 17 extending along a diametral axis thereof and formed at the center of its length with a V-shaped circumferential groove 18 the bottom of which is of a diameter approximately equal to the width of the slot 16 in the bracket arm 15, and the grooved portion of the pivot is fitted into the slot 16 as clearly shown in Figures 4, 6 and 7 so that the eyeball may have a limited universal movement in the casing B, the pivot rod being mounted in the arm 15 for pivotal movement about axes angularly disposed to the axis of the pivot rod. It will be observed that the eyeball is held against displacement through the open end of the slot 16 by the hemispherical walls 5 of the casing, and is held against displacement in other directions by the walls of the slot 16 and the bottom wall of the bracket C.

The eyeball is gravitationally movable about the pivot afforded by the pivot rod 17 and the bracket arm 15, and for this purpose the lower edge of the eyeball may have an integral or rigidly attached tab 19 projecting rearwardly therefrom and carrying a suitable counterweight or pendulum 20. The bottom wall 11 of the bracket C is cut away to form an opening 21 to permit said tab and counterweight to extend through said bottom wall and ensure free rotation of the eyeball.

In operation, upon holding of the doll head in vertical position, the gravitational action on the counterweight 20 will hold the eyeball in the position shown in Figure 4 with the pupil and iris representation 14 facing straight forwardly in the eye opening 1. Upon tilting of the doll head toward horizontal position, gravitational action will hold the eyeball approximately stationary and allow the eye opening to be moved relatively thereto to simulate closing of the eye as shown in Figure 5. Relative movement of the eyeball and head in this direction is limited by engagement of the pendulum 20 with the bottom wall of the bracket C. Relative movement of the eyeball and doll head in the opposite direction is limited by engagement of the rear edge of the eyeball with the bottom wall of the bracket C.

To simulate sidewise rolling movement of the eyeballs, the doll head may be tilted sidewise as shown in Figure 6, relative movement of the eyeballs and doll head in this direction being limited by engagement of the rear edges of the eyeballs with the bottom wall of the bracket C.

Various intermediate relative positions of the eyeball and eye openings may be produced by tilting of the doll head in different directions and to different extents, due to the relative universal movement of the eyeball and the bracket which is limited in all directions as above described, several positions being shown by Figures 1 to 3 inclusive.

Preferably the recesses or sockets 2 will be of a shape approximately corresponding to that of the casings B, although this is not necessary. The casings may be mounted in the doll head as desired. Where the doll head is formed of rubber, the walls D of the sockets 2 may be elastic and the casings B may be inserted into the sockets through the open rear ends E and held by the elastic action of the walls of the sockets. The open ends of the sockets preferably have inwardly directed elastic flanges E to overlie the end walls 9 of the casings.

If desired, the brackets C may be directly mounted in the recesses 2 with the eyeballs disposed between the brackets and the walls of the recesses surrounding the eye openings 1 in juxtaposition to said openings.

The direct and separable connection of the eyeball to the bracket through a single connection, i. e., the pivot rod and the arm 15, provides a simple, inexpensive and reliable structure. The bracket C having the arm 15 projecting from the bottom wall thereof effectually holds the eyeball against being pushed inwardly of the head as by the insertion of a child's finger or an implement through the eye opening, and the separable and rigid clamping of the bracket between the sections of the casing provides a strong, firm, and easily assembled eye unit.

A modification of the invention is shown in Figure 10 wherein the annular bracket G, corresponding to the bracket C, has two diametrically opposite arms 23 projecting from one end and formed with pivot openings or slots 24 in which opposite ends of the pivot rod 25 of the eyeball 26 are pivotally mounted so that the eyeball may swing about a horizontal diametral axis only to simulate opening and closing of the eyes. This form of bracket and eyeball may be combined with the casing B or otherwise mounted in an eye opening of a doll's head in the same manner as described in connection with the bracket C and eyeball 13.

While I have described one form of casing, it should be understood that other structures of casings and bracket supports for the eyeballs may be utilized, and the particular details of the mounting of the eyeball on the support or bracket may be modified and changed, all without departing from the spirit or scope of the invention.

Having thus described my invention, what I claim is:

1. An eye unit for a doll's head, comprising an eyeball, a bracket therefor, and a single connection therebetween mounting said eyeball on the bracket for limited universal movement relative thereto.

2. An eye unit for a doll's head, comprising an eyeball constituting a segment of a sphere, a bracket, and cooperating parts on said eyeball and said bracket mounting said eyeball for limited universal movement about the spherical center of the eyeball relative to said bracket.

3. An eye unit for a doll's head, comprising an eyeball constituting a segment of a hollow sphere, a pivot rod mounted in said eyeball and extending diametrally thereof, and a bracket having a part in which said pivot rod is mounted to permit limited universal movement of said eyeball relative to said bracket.

4. An eye unit for a doll's head, comprising an eyeball constituting a segment of a hollow sphere, a pivot rod mounted in said eyeball and extending diametrally thereof, and a bracket having an arm formed with a slot in which said pivot rod is mounted to permit limited universal movement of said eyeball relative to said bracket.

5. An eye unit for a doll's head, comprising an eyeball constituting a segment of a hollow sphere, a pivot rod in and extending diametrally of said eyeball and having a circumferential V-shaped groove at the center of its length, and a bracket having a pivot opening receiving said grooved portion of the pivot rod to permit limited universal movement of said eyeball relative to said bracket.

6. The eye unit set forth in claim 1 wherein said bracket is cup-shaped with a bottom wall and a perimetral flange and has an arm projecting angularly from said bottom wall on which said eyeball is mounted.

7. The eye unit set forth in claim 1 wherein said bracket is cup-shaped with a bottom wall and a perimetral flange and has an integral arm struck up angularly from said bottom wall and projecting from the side thereof opposite said flange, said eyeball being mounted in said arm.

8. The eye unit set forth in claim 1 wherein said bracket is cup-shaped with a bottom wall and a perimetral flange and has an integral arm on which said eyeball is mounted struck up angularly from said bottom wall and projecting from the side thereof opposite said flange, said bottom wall having an opening, and a pendulum projecting from said eyeball through said opening and responsive to gravitational force.

9. An eye unit for a doll's head, comprising an eyeball constituting a segment of a sphere, a pivot rod mounted in said eyeball and extending diametrally thereof, and a cup-shaped bracket having a bottom wall and a perimetral flange with a part projecting angularly from said bottom wall on which said pivot rod is mounted to permit limited universal movement of said eyeball relative to said bracket.

10. An eye unit for a doll's head, comprising an eyeball constituting a segment of a sphere, a pivot rod mounted in said eyeball and extending diametrally thereof, and a cup-shaped bracket having a bottom wall and a perimetral flange with a part projecting angularly from said bottom wall on which said pivot rod is mounted to permit limited universal movement of said eyeball relative to said bracket, said bottom wall having an opening, and a pendulum projecting from said eyeball through said opening and responsive to gravitational force.

11. An eye unit for a doll's head, comprising an eyeball having a diametral pivot member, and a bracket including an annular portion with a wall extending across one end thereof and a part projecting angularly from said wall upon which said pivot member is mounted for pivotal movement about axes angularly disposed to the axis of said diametral pivot.

12. An eye unit for a doll's head, comprising an eyeball having a diametral pivot member, and a bracket having a wall with an integral arm struck up angularly therefrom upon which said pivot member is mounted for pivotal movement about axes angularly disposed to the axis of said diametral pivot.

DAVID J. WAGLER.